United States Patent [19]
Rasmussen et al.

[11] Patent Number: 6,004,686
[45] Date of Patent: Dec. 21, 1999

[54] ELECTROLUMINESCENT MATERIAL AND METHOD OF MAKING SAME

[75] Inventors: Robert T. Rasmussen; David A. Cathey, both of Boise, Id.

[73] Assignee: Micron Technology, Inc., Boise, Id.

[21] Appl. No.: 09/046,069

[22] Filed: Mar. 23, 1998

[51] Int. Cl.$^6$ ............................................. B32B 9/00
[52] U.S. Cl. ..................... 428/690; 427/66; 427/126.2; 427/126.3; 427/108; 427/226; 427/380; 427/419.2; 427/419.3; 427/419.8; 313/506; 428/917
[58] Field of Search ............................. 427/66, 226, 165, 427/126.2, 126.3, 108, 419.2, 419.3, 419.8, 380; 428/690, 917; 313/506

[56] References Cited

U.S. PATENT DOCUMENTS

| | | | |
|---|---|---|---|
| 4,340,512 | 7/1982 | Schreurs | 523/122 |
| 4,931,312 | 6/1990 | de Leeuw et al. | 427/64 |
| 4,965,091 | 10/1990 | Fratello et al. | 427/64 |
| 5,151,215 | 9/1992 | Siggi | 427/64 |
| 5,167,990 | 12/1992 | Tono et al. | 427/64 |
| 5,196,229 | 3/1993 | Chau | 427/64 |
| 5,210,472 | 5/1993 | Casper et al. | 315/349 |
| 5,219,611 | 6/1993 | Giannelis et al. | 427/64 |
| 5,283,500 | 2/1994 | Kochanski | 315/58 |
| 5,372,973 | 12/1994 | Doan et al. | 437/228 |
| 5,454,892 | 10/1995 | Kardon et al. | 156/67 |
| 5,560,957 | 10/1996 | Johnson | 427/66 |
| 5,577,943 | 11/1996 | Vickers et al. | 445/24 |
| 5,628,662 | 5/1997 | Vickers et al. | 445/24 |
| 5,679,472 | 10/1997 | Wu et al. | 427/66 |

OTHER PUBLICATIONS

Brown, D. R., et al., "The Mechanism of Electrophoretic Deposition," *J. appl. Chem.*, 15, 40–47 (1965). (No Mo).

Cathey, Jr., D. A., "Field Emmission Displays," Micron Display Technology, Inc., 6 pgs. (undated).

Curtin, C., "The Field Emission Display: A New Flat Panel Technology," Conference Record of the 1991 International Display Research Conference, Oct. 15–17, pp. 12–15 (1991).

Genser, M. H., "Product: Ruthenium Film," Emulsitone Co., 5 pgs. (1996). (No Mo).

Itoh, S., et al., "Influence of Various Gases on the Emission of Field Emitter Arrays," Futaba Corporation, 2 pgs. (undated).

Mizuguchi, J., et al., "A Highly Stable Nonaqueous Suspension for the Electrophoretic Deposition of Powdered Substances," *J. Electrochem. Soc.*, 130, 1819–1825 (1983).

Nelson, T. J., et al., Abstract No. 405 "Use of Owens–Illinois GR650 as a Binder for Phosphor Screens," Bell Communications Research, Inc., Murray Hill, NJ., p. 602 (undated).

*Primary Examiner*—Janyce Bell
*Attorney, Agent, or Firm*—Mueting, Raasch & Gebhardt, P.A.

[57] ABSTRACT

The present invention provides an electroluminescent material that includes phosphor particles with an overlaying coating of a conductive inorganic oxide.

20 Claims, No Drawings

6,004,686

ELECTROLUMINESCENT MATERIAL AND METHOD OF MAKING SAME

FIELD OF THE INVENTION

The present invention is directed to display devices, such as field emission display devices, particularly to electroluminescent materials used in display devices.

BACKGROUND OF THE INVENTION

Display devices, such as desk-top computer screens and direct view and projection television sets, include electron excited fluorescent display devices such as cathode ray tubes. Cathode ray tubes (CRTs) function as a result of a scanning electron beam from an electron gun impinging on phosphors on a relatively distant glass screen. The phosphors absorb the energy from the electron beam and subsequently emit a portion of the energy, which is typically in the visible region of the electromagnetic spectrum. This visible emission is then transmitted through the glass screen to the viewer. Other display devices, such as field emission displays for use in flat panel display screens, which include cold cathode emission devices, and vacuum fluorescent displays for use in handheld calculators, which include hot cathode emission devices, also function as a result of electrons exciting phosphors on a screen.

Phosphors are inorganic luminescent materials that typically include "activator" atoms that can modify the emitted radiation, such that the emission is in the visible region, as well as modify the emission intensity and the persistence of the image. Phosphors should preferably be capable of maintaining luminescence (e.g., fluorescence) under excitation for a relatively short period of time to provide superior image reproduction. This is a characteristic known as "persistence." Typically, persistence for display phosphors is less than about 50 milliseconds. Persistence that is too long can be undesirable in display devices, causing a smearing effect on the screen, but may be desirable in a fluorescent light tube or the like. Another characteristic of phosphors is lifetime, which refers to the degradation of the phosphor over the time of use, which may extend to months or years of normal use, depending upon the application.

In general, it is desirable to produce highly pure phosphors to increase absorption of the available excitation energy by the activator that emits the required radiation, rather than being consumed by other impurities or "killer" centers, which would result in lower luminescence and lower efficiency. Therefore, the quality of the deposited phosphor is an important parameter.

Typically, in field emission displays, cathode ray tubes, powder electroluminescent cells, and other electroluminescent articles, a phosphor is deposited on an insulating substrate, which can be coated with a transparent, conductive material such as indium tin oxide (ITO) or tin oxide (TO). In conventional cathode ray tubes (CRTs), a reflective layer (such as aluminum) is evaporated on one side of the insulating substrate in order to reflect emitted light. The reflective layer and the transparent conductive material assist in dissipating charge which builds up during use.

Commonly used methods for depositing phosphors include settling techniques, slurry methods (such as screen printing, spin coating, and spin casting), electrophoresis, or dusting methods (such as electrostatic dusting, "phototacky" methods, and high pressure dusting).

In settling methods, phosphor is suspended in a solution and allowed to settle gravitationally or centrifugally onto the substrate. In slurry methods, phosphors typically are mixed with a liquid, such as a photoresist, to form a slurry or suspension. The slurry is deposited onto the substrate, dried, and exposed to ultraviolet radiation through a photomask to produce a desired pattern. Exposed areas will be washed away during development when using a positive photoresist system, for example.

In electrophoresis, phosphor particles are deposited from a suspension under the action of an electric field. They may be deposited in a pattern onto the substrate. The suspension typically includes a nonaqueous liquid, such as an alcohol, and an electrolyte, such as a salt of yttrium, cerium, indium, aluminum, magnesium, lanthanum, or thorium. Such metal salts make it possible to electrically charge the phosphor particles. The part coated typically serves as the cathode (cataphoresis). An electrochemical reaction occurs at the cathode, believed to convert metal salts to metal hydroxides, thus assisting in phosphor adhesion.

In dusting methods, a photoresist is applied to a substrate and partially dried. Phosphor particles are then blown onto the surface, sticking to the partially dried photoresist. The layer is then completely dried and exposed to radiation through a photomask to produce a desired pattern. Unexposed areas are removed during development if a negative photoresist system is used. Electrostatic dusting is carried out in a similar manner, except that electrostatic charge is used to attract the phosphor particles onto the partially dried photoresist. In "phototacky" methods, photoresist is applied and dried to a substrate, followed by exposure to radiation through a photomask. The photoresist becomes tacky in the exposed areas and phosphor is applied to the surface, sticking only to the tacky areas.

After a phosphor screen is in use (such as for a cathode ray tube or a field emission display device), other problems can develop. For example, when a voltage is applied to a phosphor screen, electrochemical reactions can occur which result in poisoning of the cathode. In addition, reactions can occur which degrade the color and/or the intensity of phosphor emission. This can be the result if applied voltage exceeds the breakdown voltage of any of the constituents of the screen.

Thus, there is a need in the art for electroluminescent materials that have good performance in terms of the ability to conduct excess charge away from a charged phosphor screen, and an ability to reduce or prevent poisoning of the cold cathode and phosphor degradation due to unwanted electrochemical reactions.

SUMMARY OF THE INVENTION

In one aspect, the present invention provides a method of forming a conductive electroluminescent material comprising: providing a substrate having phosphor particles coated thereon; providing a composition comprising a polymeric precursor of a conductive inorganic oxide and a liquid medium; depositing the composition onto the phosphor particles to form a polymeric precursor coated substrate; and converting the polymeric precursor of a conductive inorganic oxide to a conductive inorganic oxide overlaying the phosphor particles to form the conductive electroluminescent material. Preferably, the converting step comprises drying the coated substrate for a time sufficient to remove the liquid medium, and heating the coated substrate for a time sufficient to form a conductive inorganic oxide overlaying the phosphor particles to form the conductive electroluminescent material. Optionally, a binder precursor, such as a precursor of a silicate binder, may be mixed with the polymeric precursor composition and coated onto the phosphor layer. Alternatively, the binder precursor may be coated onto the conductive inorganic oxide layer and converted, such as by drying, to a binder.

In another aspect, the present invention provides a method of making a field emission display device comprising: providing phosphor particles on an electrically conductive transparent substrate; providing a composition comprising a polymeric precursor of a conductive inorganic oxide in a liquid medium; depositing the composition onto the phosphor particles to form a polymeric precursor coated substrate; and converting the polymeric precursor of a conductive inorganic oxide to a conductive inorganic oxide overlaying the phosphor particles to form a conductive electroluminescent material.

In yet another aspect, this invention provides a conductive electroluminescent material comprising phosphor particles having an overlaying coating of a substantially continuous layer of a conductive inorganic oxide. Optionally, the conductive electroluminescent material further comprises a binder. The binder may be mixed with the phosphor particles or may be mixed with the coating of the conductive inorganic oxide. The conductive inorganic oxide is preferably selected from the group of indium oxide, tin-doped indium oxide, tin oxide, antimony-doped tin oxide, and mixtures of these.

DETAILED DESCRIPTION

The present invention provides conductive electroluminescent materials and methods for forming electroluminescent materials. Preferably, the electroluminescent materials are formed on a substrate in the preparation of an electroluminescent device, such as field emission displays, cathode ray tubes, powder electroluminescent cells, and the like. Conductive electroluminescent material includes a layer of a conductive inorganic oxide (preferably, a substantially continuous layer) overlaying phosphor particles, and optionally a binder. The layer of conductive inorganic oxide, when present in a field emission display device or similar fluorescent display device, for example, serves to bleed away build-up of electrostatic charge and to reduce or eliminate electrochemical reactions that can quench phosphor luminescence and poison the cold cathode. The advantage of the layer of conductive inorganic oxide (preferably, a substantially continuous layer) is that it does not adversely affect the properties (e.g., transparency, conductivity, and efficiency) of phosphors in electroluminescent articles.

Preferably, the substrate on which the electroluminescent material is disposed is a transparent, insulating substrate, such as glass. Other transparent insulating substrates may be suitable in the practice of this invention. The substrate may have coated thereon a transparent electrically conductive coating on which the phosphor particles are deposited. If present, this coating is distinct from the conductive inorganic oxide layer which is coated over the phosphor particles. The transparent conductive coating, which is coated directly on the substrate, is typically one of indium tin oxide (ITO), tin oxide, cadmium oxide, zinc oxide, and the like. Preferably, the transparent conductive coating is indium tin oxide or tin oxide. More preferably, the transparent conductive coating is indium tin oxide.

The phosphor particles useful in this invention are electroluminescent particles that may be conductive or nonconductive. Particularly suitable phosphors for use in field emission displays, for example, are dielectric (nonconducting) phosphors. Examples of such phosphors include a variety of metal oxide, sulfide, fluoride, and silicate compounds. For example, such phosphor particles include manganese- and arsenic-activated zinc silicate (P39 phosphor), titanium-activated zinc silicate, manganese-activated zinc silicate (P1 phosphor), cerium-activated yttrium silicate (P47 phosphor), manganese-activated magnesium silicate (P13 phosphor), lead- and manganese-activated calcium silicate (P25 phosphor), terbium-activated yttrium silicate, terbium-activated yttrium oxide, terbium-activated yttrium aluminum oxide, terbium-activated gadolinium oxide, terbium-activated yttrium aluminum gallium oxide, europium-activated yttrium oxide, europium-activated yttrium vanadium oxide, europium-activated yttrium oxysulfide, and the like.

Phosphor particles typically have a size of less than about 15 microns ($\mu$m), but often less than about 10 $\mu$m, and preferably, less than about 5 $\mu$m, although larger sized particles can be produced and milled to a smaller particle size. Phosphor particles preferably are deposited in a smooth, homogeneous layer, ranging in thickness from about 0.3 $\mu$m to about 40 $\mu$m by any of a variety of techniques known to one of skill in the art. Such techniques include settling techniques, slurry methods (such as screen printing, spin coating, and spin casting), electrophoresis, or dusting methods (such as electrostatic dusting, "phototacky" methods, and high pressure dusting). Settling techniques and slurry methods involve forming a dispersion of the phosphor particles in a suitable liquid medium. A preferred deposition method is electrophoresis.

In the method of this invention, a solution of a polymeric precursor of a conductive inorganic oxide is deposited over the phosphor particles, which are deposited on a substrate. Suitable compounds that are precursors to the conductive inorganic oxide include polymeric precursors of metallic oxides. These precursors form conductive coatings of indium oxide, tin-doped indium oxide, tin oxide, and antimony-doped tin oxide under the appropriate conditions. Suitable precursor compounds are commercially available from Alfa Aesar of Ward Hill, Mass. and are characterized by the manufacturer as: indium oxide, polymeric precursor, soluble in hexane and toluene, oxide content of approximately 35 weight percent; indium oxide, tin-doped, polymeric precursor, soluble in hexane and toluene, oxide content of approximately 35 weight percent; tin oxide, polymeric precursor, soluble in alcohols, oxide content of approximately 29 weight percent; and tin oxide, antimony-doped, polymeric precursor, soluble in alcohols, oxide content of approximately 30 weight percent. These polymeric precursors are typically heated to a temperature effective to convert them to their respective conductive inorganic oxides. Typically, the temperature at which this occurs is at least about 400° C.

Materials that form binders for enhancing the adhesion of phosphor and/or conductive inorganic oxide to the substrate may also be added when depositing phosphors and polymeric precursors of the inorganic oxide. That is, a material that forms a binder, i.e., a binder precursor, can be mixed with a composition (typically a slurry or dispersion) of phosphor particles or a composition (typically, a solution) of a polymeric precursor of an inorganic oxide. Alternatively, binder precursors can be deposited after the phosphor layer or inorganic oxide layer has been deposited. Such materials are then dried and/or heated to form the binder. Suitable binder precursor materials include colloidal silica and various silicates, both inorganic silicates such as sodium silicate and potassium silicate, and organosilicates, such as that available from Techneglas under the trade designation GR650F. Such binder precursor materials may be treated by thermal energy or by plasma or ultraviolet light to form the binder. Certain of these materials are desirable binders because low temperature treatment (i.e., room temperature up to about 200° C.) is sufficient to convert them to effective binders. An effective binder is capable of producing good adhesion of the phosphor to the substrate and phosphor to phosphor.

It may be desirable to deposit a phosphor, a polymeric precursor of an inorganic oxide, and/or a binder precursor out of a composition (e.g., a solution, a slurry, a dispersion) containing a liquid medium. The liquid medium is preferably a nonaqueous liquid, which can be selected from a wide variety of liquids commonly used in the deposition of phosphors. These include, but are not limited to, polar organic liquids such as alcohols (e.g., methanol, ethanol, isopropanol), ketones (e.g., acetone), nitromethane, and nitropropane. Depending upon the dispersion characteristics of the phosphor, it is also possible to use water as the liquid medium.

In a preferred method of the invention, a composition of a polymeric precursor of a conductive inorganic oxide is deposited onto a phosphor layer, and heated to convert the polymeric precursor of the conductive inorganic oxide. Optionally, a binder precursor can be coated onto the substrate in the same step as that of the polymeric precursor of the conductive inorganic oxide or in a separate step. For example, a binder precursor can be deposited over the conductive inorganic oxide layer. The deposition of the polymeric precursor composition and/or the binder precursor composition can be accomplished by a variety of solution coating techniques known to those of skill in the art. Preferably, spin coating is used.

The amount of the polymeric precursor of conductive inorganic oxide deposited on the phosphor particles is at least sufficient to impart improved conductivity compared to phosphors having no inorganic oxide deposited on them. Typically, the amount of polymeric precursor in a composition (e.g., a solution) ranges from about 0.1 weight percent to about 10 weight percent, based on total solids content. The amount will vary depending on the type of phosphor this material will be overcoating.

The polymeric precursor of the inorganic oxide may be dried for a time sufficient to remove the liquid medium from the polymeric precursor. If spin coating is used, however, this may not be required. The polymeric precursor is then heated at a temperature of at least about 400° C., preferably, at a temperature ranging from about 400° C. to about 450° C., for a time sufficient to convert the polymeric precursor to a conductive inorganic oxide and burn off any organics. The conductive inorganic oxide layer is preferably sufficiently thick so as to be substantially continuous yet sufficiently thin so as not to substantially reduce the efficiency of the phosphor. The desired materials for this layer are preferably transparent. They reduce or eliminate electrochemical reactions on the phosphor layer that result in high voltage potential across the phosphor layer.

The methods described herein can be used for forming a wide variety of electroluminescent materials in a wide variety of electroluminescent devices. Although the methods of the present invention are particularly suitable for use in the preparation of computer display devices, particularly field emission displays, they can be used to prepare a variety of other electron excited fluorescent display devices, such as a standard CRT used in television sets, virtual reality screens, book video screens, head-mounted display devices, and the like. Typically, dielectric (nonconductive) phosphors are used on the transparent, conductive coating (e.g., ITO) of such devices, instead of conductive phosphors. Although conductive phosphors may be more desirable because they conduct charge away and do not allow charge to build up, dielectric phosphors are more readily available and can be more stable when used for desired applications such as field emission displays.

Field emission displays typically include a display panel having a transparent gas-tight envelope, and two main planar electrodes arranged within the gas-tight envelope parallel with each other. One of the two main electrodes is a cold cathode with a grid, and the other is an anode. The anode may consist of a transparent glass plate, an electrode formed on the transparent glass plate, and a phosphor layer coated on the transparent electrode. Devices such as these are further disclosed in U.S. Pat. Nos. 5,210,472 (Casper et al.), 5,372,973 (Doan et al.), and 5,577,943 (Vickers et al.), for example.

The invention will be further described by reference to the following detailed example. This example is offered to further illustrate the various specific and illustrative embodiments and techniques. It should be understood, however, that many variations and modifications may be made while remaining within the scope of the present invention.

EXAMPLE

Phosphor compositions are prepared by mixing 0.001 to 0.1 weight percent of a metal salt (lanthanum nitrate hexahydrate, aluminum nitrate nonahydrate, indium nitrate hydrate, thorium nitrate hydrate or magnesium nitrate hydrate), 0.001 to 1 weight percent of glycerol, and 0.1 to 10 weight percent of a phosphor in iso-propanol (IPA). This phosphor suspension is deposited onto a faceplate by cataphoresis and then dried at room temperature to remove the IPA.

Polymeric precursors to conductive inorganic oxides are made into solutions containing 1 to 5 weight percent of the precursors in the appropriate solvent:

indium oxide polymeric precursor in toluene;

tin-doped indium oxide polymeric precursor in toluene;

tin oxide polymeric precursor in IPA; or antimony-doped tin oxide polymeric precursor in IPA.

The solutions are deposited over the phosphor layer by spin coating. Each of the samples is dry at the end of the spin coat operation. Each sample is then heated to at least about 400° C. to convert the polymeric precursor to a conductive inorganic oxide.

An organosilicate (commercially available as Techniglas GR650F) binder precursor solution is prepared by diluting the organosilicate in IPA to about 0.1 weight percent to about 5 weight percent. This solution is deposited over the conductive inorganic oxide layer using spin coating and then cured. Alternatively, a binder layer can be deposited onto the phosphor layer, and then dried and cured, before deposition of the polymeric precursor of the conductive inorganic oxide. In another variation, a composition containing both the organosilicate and the polymeric precursor in appropriate solvent (such as isopropanol) can be spin coated onto the phosphor layer and heated to form a conductive inorganic oxide in a binder.

The complete disclosure of all patents, patent documents, and publications cited herein are incorporated by reference. The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of forming a conductive electroluminescent material comprising:
    providing a substrate having phosphor particles coated thereon;
    providing a composition comprising a polymeric precursor of a conductive inorganic oxide and a liquid medium;
    depositing the composition onto the phosphor particles to form a polymeric precursor coated substrate; and
    converting the polymeric precursor of a conductive inorganic oxide to a conductive inorganic oxide overlaying the phosphor particles to form the conductive electroluminescent material.

2. The method of claim 1 wherein the step of converting comprises:
    drying the coated substrate for a time sufficient to remove the liquid medium; and
    heating the coated substrate for a time sufficient to form a conductive inorganic oxide overlaying the phosphor particles to form the conductive electroluminescent material.

3. The method of claim 1 wherein the composition comprising the polymeric precursor of a conductive inorganic oxide further comprises a precursor of a silicate binder.

4. A method of forming a conductive electroluminescent material comprising:
    providing a substrate having phosphor particles coated thereon;
    providing a composition comprising a polymeric precursor of a conductive inorganic oxide and a liquid medium;
    depositing the composition onto the phosphor particles to form a polymeric precursor coated substrate;
    heating the polymeric precursor coated substrate for a time sufficient to form a conductive inorganic oxide overlaying the phosphor particles;
    applying a binder precursor over the conductive inorganic oxide; and
    converting the binder precursor to a binder to form the conductive electroluminescent material.

5. The method of claim 4 wherein the substrate is a transparent insulating substrate.

6. The method of claim 5 wherein the substrate is glass.

7. The method of claim 4 wherein the substrate has an electrically conductive coating underlaying the phosphor particles.

8. The method of claim 7 wherein the electrically conductive coating underlaying the phosphor particles is selected from the group of indium tin oxide and tin oxide.

9. The method of claim 4 wherein the conductive inorganic oxide is selected from the group of indium oxide, tin-doped indium oxide, tin oxide, antimony-doped tin oxide, and mixtures of these.

10. The method of claim 4 wherein the step of heating to form a conductive inorganic oxide is carried out at a temperature of at least about 400° C.

11. A method of making a field emission display device comprising:
    providing phosphor particles on an electrically conductive transparent substrate;
    providing a composition comprising a polymeric precursor of a conductive inorganic oxide in a liquid medium;
    depositing the composition onto the phosphor particles to form a polymeric precursor coated substrate; and
    converting the polymeric precursor of a conductive inorganic oxide to a conductive inorganic oxide overlaying the phosphor particles to form the conductive electroluminescent material.

12. The method of claim 11 wherein the step of converting comprises:
    drying the coated substrate for a time sufficient to remove the liquid medium; and
    heating the coated substrate for a time sufficient to form a conductive inorganic oxide overlaying the phosphor particles to form the conductive electroluminescent material.

13. The method of claim 12, further comprising:
    applying a binder precursor over the conductive inorganic oxide; and
    converting the binder precursor to a binder to form the conductive electroluminescent material.

14. The method of claim 11 wherein the electrically conductive transparent substrate is indium tin oxide-coated glass.

15. The method of claim 11 wherein the step of heating to form a conductive inorganic oxide is carried out at a temperature ranging from about 400° C. to about 450° C.

16. The method of claim 11 wherein the conductive inorganic oxide is selected from the group of indium oxide, tin-doped indium oxide, tin oxide, antimony-doped tin oxide, and mixtures of these.

17. A conductive electroluminescent material disposed on a substrate comprising the substrate having coated thereon a conductive coating, the conductive coating having phosphor particles coated thereon and an overlaying coating of a substantially continuous layer of a conductive inorganic oxide.

18. The conductive electroluminescent material of claim 17 wherein the conductive inorganic oxide is selected from the group of indium oxide, tin-doped indium oxide, tin oxide, antimony-doped tin oxide, and mixtures of these.

19. The conductive electroluminescent material of claim 17 further comprising a silicate binder.

20. The conductive electroluminescent material of claim 17 wherein the phosphor particles are selected from the group of manganese- and arsenic-activated zinc silicate, titanium-activated zinc silicate, manganese-activated zinc silicate, cerium-activated yttrium silicate, manganese-activated magnesium silicate, lead- and manganese-activated calcium silicate, terbium-activated yttrium silicate, terbium-activated yttrium oxide, terbium-activated yttrium aluminum oxide, terbium-activated gadolinium oxide, terbium-activated yttrium aluminum gallium oxide, europium-activated yttrium oxide, europium-activated yttrium vanadium oxide, europium-activated yttrium oxysulfide, and the like.

* * * * *